P. GAUTHIER.
ARMOR CHAIN.
APPLICATION FILED MAY 15, 1913.
1,080,054.
Patented Dec. 2, 1913.
2 SHEETS—SHEET 1.
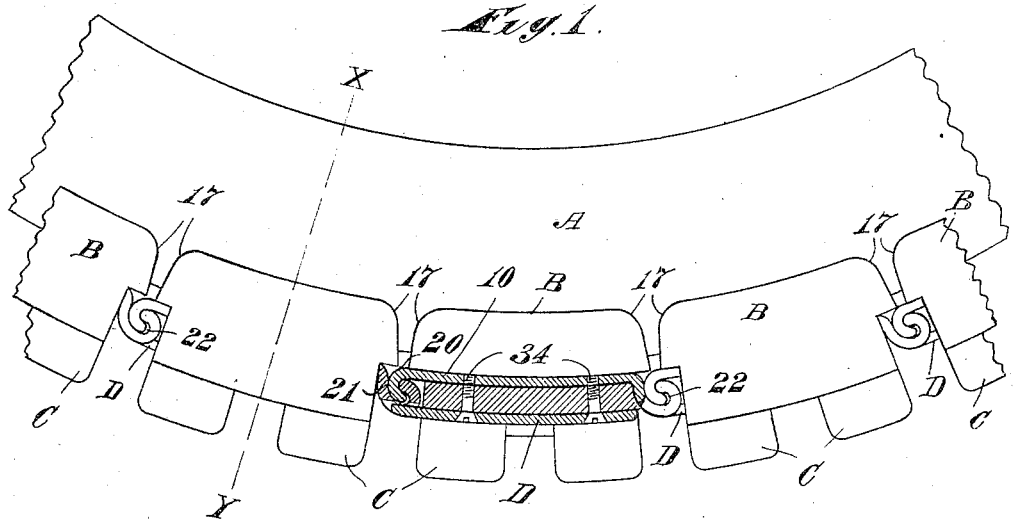
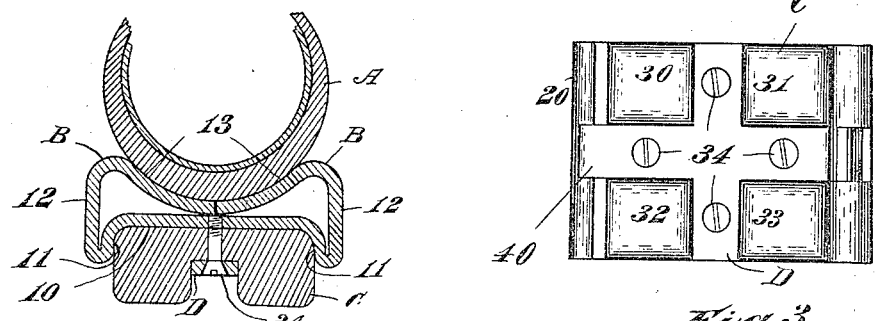
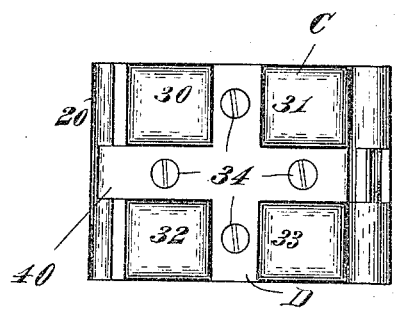
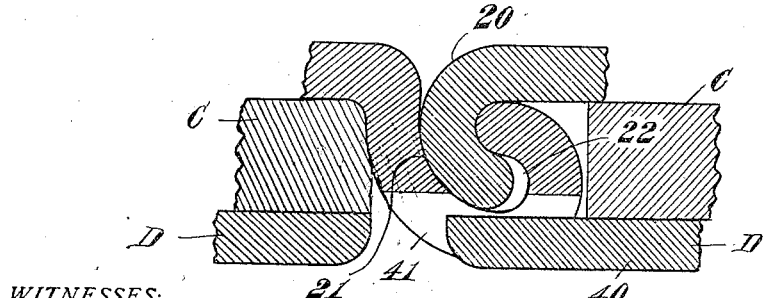
WITNESSES:
INVENTOR.
Phebia Gauthier
BY Gardner W. Pearson
ATTORNEY.

P. GAUTHIER.
ARMOR CHAIN.
APPLICATION FILED MAY 15, 1913.

1,080,054.

Patented Dec. 2, 1913.

2 SHEETS—SHEET 2.

WITNESSES:
Ludger A. Nicol
Vera J. Dureman

INVENTOR.
Philias Gauthier
BY
Gardner A. Pearson
ATTORNEY.

UNITED STATES PATENT OFFICE.

PHIBIA GAUTHIER, OF LOWELL, MASSACHUSETTS.

ARMOR-CHAIN.

1,080,054.  Specification of Letters Patent.  Patented Dec. 2, 1913.

Application filed May 15, 1913. Serial No. 767,826.

*To all whom it may concern:*

Be it known that I, PHIBIA GAUTHIER, a citizen of the United States, residing at Lowell, in the county of Middlesex and State of Massachusetts, have invented certain new and useful Improvements in Armor-Chains, of which the following is a specification.

My invention relates to armor for tires, and especially for pneumatic tires. Its purpose is to provide an armor which will yield vertically as the vehicle to which the tire is attached moves along and which will protect the tire tread from punctures, stone, etc. Its purpose also is to act as a substitute for the well known forms of anti-slipping chains. It is so made that it presents to the road, metal shoes with calks in the winter time and an elastic surface such as rubber in the summer time.

Figure 5:
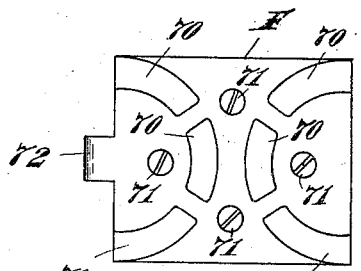
Figure 6:
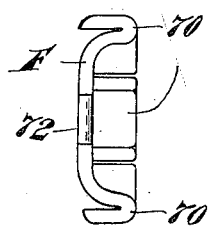
Figure 7:
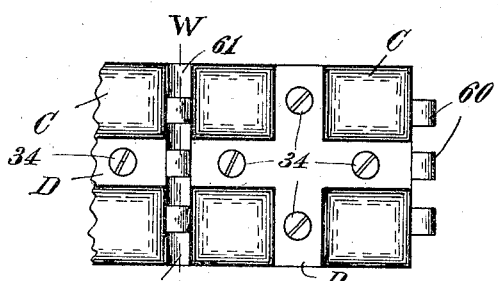
Figure 8:
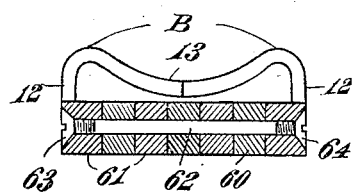
Figure 9:
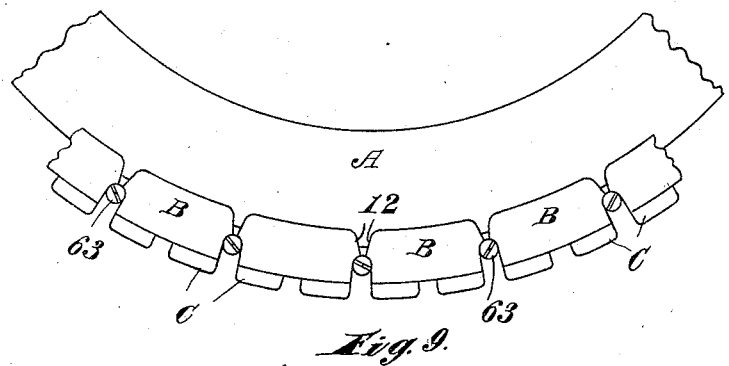

In the drawings, Figure 1 is an elevation partly in section of a portion of tire with my armor attached viewed from the side. Fig. 2 is a section of Fig. 1 on line X—Y. Fig. 3 is a plan view of the outside or face of a section of my armor. Fig. 4 is an enlarged side elevation partly in section of my preferred form of joint. Fig. 5 is a plan view from the face or outside of a metal shoe with calks for use in slippery weather. Fig. 6 is a view of Fig. 5 from the left. Fig. 7 is a plan view from the face or outside of a section of my armor with a different form of hinge. Fig. 8 is a sectional elevation of Fig. 7 on line W—Z. Fig. 9 is an elevation from the side of a section of tire with my armor attached showing the form of hinge in Figs. 7 and 8.

A represents a tire of the ordinary pneumatic type.

B, B represent sections of my armor which I will now proceed to describe.

Each section B is preferably made of sheet metal bent in the middle at 10 into a substantially laterally flat face with a ridge 11 bent at each side so as to form a channel in which is seated the wearing surface of my armor. This wearing surface may be a soft pad C preferably of rubber or similar resilient material. From 11, the sides are bent back at 12 at right angles to face 10 and are bent over and back at 13 to conform to the shape of the outer portion or tread of the tire A. The edges of B meet each other at a point where they also bear against the back of face portion 10 as shown in Fig. 2. At one end the face portion 10 is bent into an outward curve 20 as shown in detail in Figs. 1 and 4 and at the other end it is bent into a corresponding inward curve 21 adapted to engage curve 20 in such a manner that the space 22 will be left between the ends thereof. This forms my preferred form of hinge or coupling joint. It is cheaply made and has a large bearing surface with little opportunity for dirt or dust to get in to interfere with the operation. The play is limited in one direction by the end of 20 striking the curve in the end 21, while in the other direction there is no limit as the parts can be separated. To lock the parts in position, I adopt the following method: The pad C has four projections 30, 31, 32 and 33 with channels between them in the form of a cross. In these crossed channels, I place the attaching member D which can be attached to or detached from section B by means of screws 34 which pass through suitable holes in member D into threaded holes in face plate 10. Arm 40 of attaching member D is prolonged so that it will extend into a slot 41 in curved end 21. This slot 41 is so cut as to allow of a normal space between its bottom and the end of 40 as shown in Figs. 1 and 4. There is also some play at the other end so that the joint can move but so that when the end of 40 strikes the end of 41 or the inner side strikes the inner end of 41, the hinge action will be stopped. With this type of hinge or joint, there is practically no chance for stones and dirt to get jammed between the working parts for the reason that the end of 40 pushes any such out of slot 41, keeping it clear at all times. The end of 40 and the opposite end of the cross of attaching member D are preferably rounded as shown in Fig. 4 to prevent pebbles, etc., from being pinched between them.

To assemble the parts, a curved end 20 is slid sidewise into a curved end 21 or they may be hooked together endwise. In either case this is done before the pad C or attaching member D are in place on both sections. They may be in place on one section but not on both. Pad C is now put in place and held by attaching member D which is screwed in place thereon. This brings the extended arm 40 into slot 41 whereby any lateral displacement is prevented and the hinge action is limited by the size of the space 22 and the depth of slot 41. The next member is similarly connected and C and D put in place and so on until the construction is of a length equal to the circumference of the tire less one section. All the sections except the last can be put together with the armor spread out on the floor and straight until it is necessary to put it on the tire. To put on the tire, it will be desirable to deflate the tire and draw the armor chain together by means of a screw clamp so as to leave a distance between the ends just equal to the length of a section. With my preferred form of joint both ends of the last section are slipped sidewise into the corresponding ends of the end sections, the pads and attaching members of which have been left off to permit it. The pads and attaching members of these last three sections are now put in place and the armor chain is in place and complete.

In the form of hinge shown in Figs. 7, 8 and 9 the projections 60 engage projections 61 through all of which passes a pin hole of uniform size for the reception of pin 62. To hold this pin in place, the projection 60 at each end is threaded to receive a screw 63 or 64 which holds pin 62 in place. Sections with such projections can be readily connected by engaging projections 60 with projections 61 and then pushing the pin 62 into place and then locking it between screws 63 and 64.

Instead of using the form of hinged joint shown in Figs. 1 and 4, I may use all the way around joints like those shown in Figs. 7, 8 and 9.

The sides 12 at each end as shown at 17 in Fig. 1 are cut away in a radial direction from the center of rotation of each hinge joint. This permits a play between the protecting sides 12 without binding.

I prefer to make the width of my sections B a little greater than the tire so that when running close to a curbstone for instance any scraping will be taken up by the metal at 12 rather than by the tire.

In winter time, it may be desirable to replace the pad C and the attaching member D by a shoe F made of metal with projecting calks 70 and with four holes for screws 71 by which it is attached directly to plate 10 of a section B. For the first described type of hinge, it has a tang or tail 72 which performs the function of long member 40. The calks 70 serve to prevent slipping in the winter time. When the second form of hinge is used, the tang 72 is not necessary.

With my armor chain, the sections B present a larger flat surface than the tire itself and as this flat surface is provided with projections 30 preferably of elastic material such as rubber they give a better hold on the road and at the same time, they do not sink deeply in sand. It therefore runs more easily in sand and through mud than the ordinary tire and at the same time protects the tire from punctures.

It will be observed that each section B is substantially flat and covers a considerable area laterally of the tire and as each is stiff and rigid it acts somewhat like a snow shoe as it prevents the wheel from sinking so deeply into sand or mud as it would with a narrower tread. As each section is made of sheet metal and is therefore light the chains do not add greatly to the weight of the vehicle and as each section may have a resilient pad C the movement of the vehicle is made quite easy. As each section and each pad is readily detachable repairs can rapidly be made. Moreover as the hinge joint whether of the type shown in Fig. 4 or that shown in Fig. 8 extends the entire width of the chain tread and as the sides 12 extend up along side the tire it is impossible for the armor chain to slip off or to be forced off by a side thrust.

What I claim as my invention and desire to cover by Letters Patent, is:

1. An armor chain for tires comprising a plurality of sections hinged together each of which is formed of sheet metal so shaped as to have a channeled face together with sides which project on each side of the tire and extend up thereon and bent back to fit the tread of the tire, together with detachable bearing members as described.

2. An armor chain for tires comprising a plurality of sections formed of sheet metal each of which is bent at one end into an outward curve and at the other end into a corresponding inward curve the outward curve having a longitudinal slot, together with detachable bearing members, and attaching members for the bearing members each attached to a section one portion of each of which extends into a slot in an adjoining section as described.

3. In an armor chain for tires, a plurality of sections hinged together each section being formed of sheet metal so shaped as to have a channeled face together with sides which project on each side of the tire and extend up thereon and are bent back to fit the tread of the tire the ends of the sides being cut away slantingly said sheet metal being bent at one end into an outward curve and at the other end into a corresponding inward curve the outward curve having a longitudinal slot, together with a detachable bearing member which fits into the channeled face, and an attaching member in the form of a cross one end of which extends into a slot in an adjoining sheet metal section, and screws which pass through the attaching member and the bearing member into the sheet metal section as described.

4. In an armor chain for tires, a plurality of sections hinged together each section being formed of sheet metal so shaped as to have a channeled face together with sides which project on each side of the tire and extend up thereon and are bent back to fit the tread of the tire the ends of the sides being cut away slantingly said sheet metal being bent at one end into an outward curve and at the other end into a corresponding inward curve the outward curve having a longitudinal slot, together with a detachable bearing member, an attaching member in the form of a cross one end of which extends into a slot in an adjoining section this end and the opposite end being rounded on the outer edge, and screws which pass through the attaching member and bearing member into the section as described.

5. In an armor chain for tires, a plurality of sections hinged together each section being formed of sheet metal so shaped as to have a channeled face together with sides which project on each side of the tire and extend up thereon and are bent back to fit the tread of the tire the ends of the sides being cut away slantingly said sheet metal being bent at one end into an outward curve and at the other end into a corresponding inward curve the outward curve having a longitudinal slot, together with a detachable member which has an extension which enters one of said slots in an adjoining section as described.

6. An armor chain for tires comprising a plurality of sections each of which is formed of sheet metal so shaped as to have a channeled face together with sides which extend up on the tire and bent back to fit the tread of the tire together with detachable flat faced bearing members, said sections being hinged together by a joint which extends across each section as described.

In testimony whereof I, hereto affix my signature in presence of two witnesses.

PHIBIA GAUTHIER.

Witnesses:
  GARDNER W. PEARSON,
  FISHER H. PEARSON.